Jan. 16, 1962  A. W. EVANS ET AL  3,017,254
APPARATUS FOR THE PRODUCTION OF TITANIUM TETRACHLORIDE
Filed June 16, 1958  2 Sheets-Sheet 1

INVENTORS
ARTHUR WALLACE EVANS
JAMES DENNIS GROVES
BY
Oscar H. Spencer
ATTORNEY

Jan. 16, 1962 A. W. EVANS ET AL 3,017,254
APPARATUS FOR THE PRODUCTION OF TITANIUM TETRACHLORIDE
Filed June 16, 1958 2 Sheets-Sheet 2

INVENTORS
ARTHUR WALLACE EVANS
JAMES DENNIS GROVES
BY
Oscar H. Spencer
ATTORNEY

United States Patent Office 3,017,254
Patented Jan. 16, 1962

3,017,254
APPARATUS FOR THE PRODUCTION OF TITANIUM TETRACHLORIDE
Arthur Wallace Evans, Nunthorpe, Middlesbrough, and James Dennis Groves, Stockton-on-Tees, England, assignors to British Titan Products Company Limited, York, England, a corporation of Great Britain
Filed June 16, 1958, Ser. No. 742,404
5 Claims. (Cl. 23—284)

This invention relates to the production of metal halides and is particularly concerned with the production of titanium tetrachloride by chlorination of titanium bearing material.

The chlorination of titanium ores and like material is complicated by the fact that unreacted chlorine frequently appears in the exit gases.

According to this invention, this and other difficulties attendant to chlorination may be minimized using the apparatus and method herein contemplated. In the practice of this invention there is employed a furnace having a chlorination chamber in which a fluidized bed can be established. This furnace is provided in a lower portion thereof with a base having a plurality of conduits therein for introduction of chlorine into the bed and having gas permeable means to obstruct downward passage of particles of the fluidized bed into the conduits.

The furnace may be conveniently cylindrical providing a cylindrical interior. At the bottom is provided a flow or perforated base. The perforated refractory base preferably comprises a refractory plate provided with orifices or like conduits which are provided with gas permeable means such as a permeable diaphragm in the form of discs, covers with ports thereon, or the like. The pressure drop across the plate is as high as practicably possible and at least one half, rarely over 50 times and usually of the same order as the pressure drop across the bed. The discs, diaphragms or other means adjacent the upper or exit ends of the perforations or conduits allow the upward flow of the gas, but prevent the return flow of dust or other undesirable solid material from entering either the perforations or the gas chamber below the plate. The provision of this type of construction in the perforated plate enables additionally a uniform gas distribution by use of the orifices which because of their position are unlikely to become overheated, or obstructed, and may furthermore be easily detached for examination without removal of the plate.

Below the plate is a chamber into which a suitable controlled quantity of chlorine may be admitted by means of the conduit. The bed above consists of the metal bearing material to be chlorinated, usually in the form of the oxide, carbide or carbonitride in pulverulent state of a size such that the particles may be chlorinated in a fluidized or suspended bed. Into the bed is fed the material to be chlorinated.

The nature of the apparatus and the inventive embodiments thereof may be more fully understood by reference to the ensuing disclosure taken with the accompanying drawings in which:

FIG. 1 is a diagrammatic elevational view partially in section of a furnace suitable for the practice of embodiments of the present invention.

FIG. 2 is an enlarged sectional view of a specific type of chlorine conduit illustrated in FIG. 1 and coming within the scope of the present invention. The specific structure of this conduit is described and claimed in a copending United States application of Coates and Hayden, Serial No. 565,251, filed February 13, 1956, now Pat. No. 2,957,-757.

Figure 1:
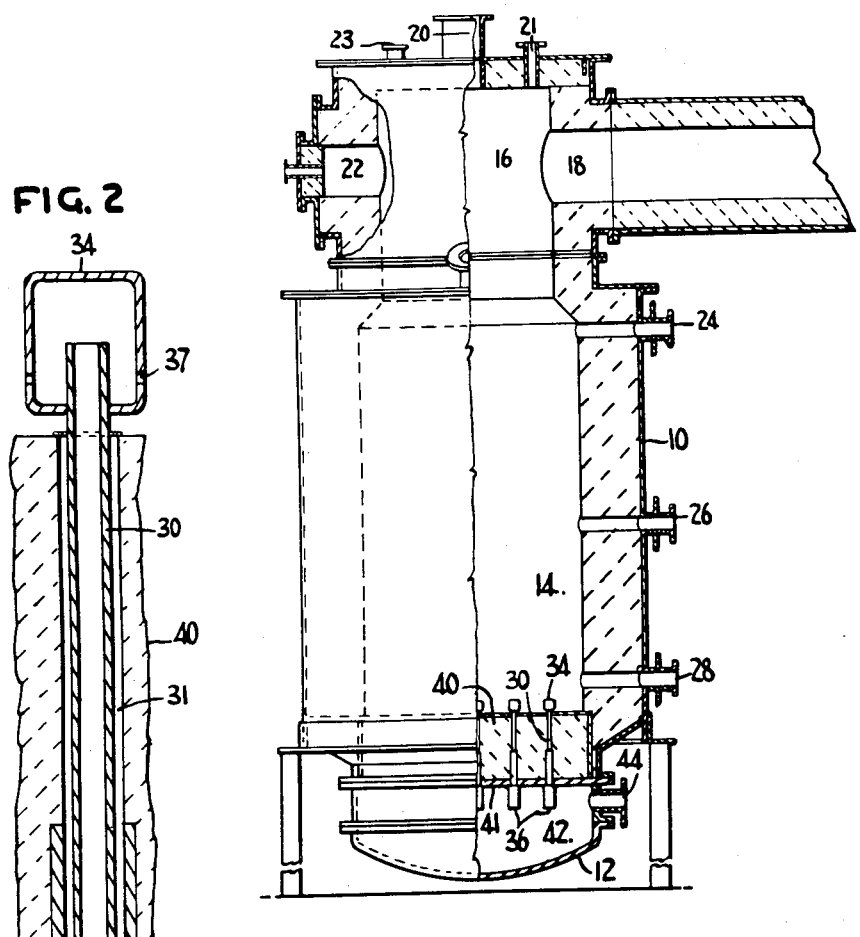

As shown in the drawing, the furnace in which the reactions herein contemplated may be conducted conveniently may be a shaft furnace 10 having a shaft or reactor section 14, a top section 16, and a bottom or chlorine distributor section 12. The reactor section 14 comprises a shaft lined with refractory brick capable of withstanding the attack of chlorine at the temperature of operation. The internal diameter of such shaft may be of any convenient size and, in commercial operation, normally exceeds about 3 feet. Several outlets 24, 26, and 28 extend through the reactor wall and provide means for withdrawing samples of the bed or the chloride vapors or for introduction of coolants, such as titanium tetrachloride, into the bed.

Disposed in the top section 16 is a vapor outlet duct 18 for removal of vapors resulting from the chlorination of the metal bearing material and an inlet 22 for introduction of ore-carbon mixtures into the reaction section. Several top inlets 20, 21, and 23 are provided in the head of the furnace for easy access into the furnace from the top.

The chlorine distributor section 12 is removably attached to the bottom of the reactor section 14 and is designed to provide a uniform supply of chlorinating gas to the bed within the reactor. This section consists of a refractory base 40 which serves as the bottom or floor of the reactor and which rests upon metal plate 41 which in turn is bolted to the bottom of the shaft.

Figure 3:
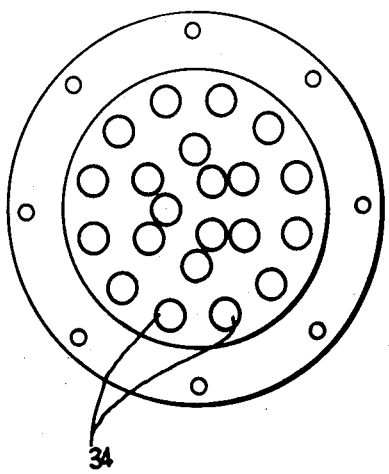
FIG. 3 is a plan view of the distributor illustrated in FIG. 1.

A plurality of spaced gas conduits 30 extend through the plate 41 and the base 40, providing communication between the chlorinating gas header 42 and the interior of the shaft furnace. These conduits are uniformly disposed throughout the base (see FIG. 3) at a convenient spacing, for example, 3 to 15 inches, preferably less than 12 inches, between centers.

Each conduit is provided at its lower end with an orifice 36 which is carefully machined, usually of metal, to provide a substantial pressure drop across the orifice. To achieve substantially uniform flow through each orifice, each should be designed to provide substantially the same pressure drop. At the upper end of each conduit is a head 34 which is closed at the top in order to prevent fall of ore into the conduit and which provides ports 37 in the sides thereof to permit flow of the chlorinating gas into the reaction zone in the shaft furnace.

Figure 2:
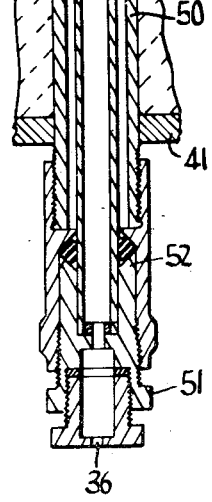

FIG. 2 illustrates a convenient means for achieving the objectives of this invention. The specific structure therein illustrated is described and claimed in the aforesaid application, Serial No. 565,251, now Pat. No. 2,957,757. As shown therein, there is provided a metal sleeve 50 which is brazed to the plate 41 to provide a gas tight seal. This sleeve extends upwardly a short distance into the refractory base 40. On each such sleeve is a nipple 52 in which a refractory conduit 30 is mounted. This conduit extends through the opening 31 in the refractory 40 and terminates in a hollow head 34 above the top surface of refractory 40. These heads are provided with a plurality of ports 37. In the lower end of nipple 52 there is disposed another nipple 51 into which a plug having an orifice 36 is removably mounted. The various joints are gas tight and thus the header 42 is isolated from the reaction zone except through conduits 30 which in turn are non-porous and therefore essentially gas tight.

In the operation of the process, the furnace is brought up to temperature in any convenient way as, for example, by introducing a bed of coke or other carbonaceous material, usually having a particle size of 200 to 250 microns or smaller, into the reactor through inlet 22. The coke is ignited and air or oxygen is blown through the conduits 30 to support combustion and to fluidize the coke. After the temperature of the furnace has raised to the desired level, usually above 500° C. and preferably 700 to 900° C. and rarely over about 1200 to 1400° C., it is ready for commencement of the chlorination process.

The ore or like material subjected to chlorination is mainly of the order of size 75 to 500 microns, with an average of 100 to 150 microns, and is mixed with powdered carbon, coke, anthracite or equivalent carbonaceous material with an average size of approximately 200 to 250 microns or below, but often having a wide scatter. The percentage of carbon to be added may vary according to other conditions such, for example, as the oxygen content of the chlorine gases fed in, but is usually from 10 to 50 percent by weight of the total ore. Normally, the ore-carbon mixture is blended before feeding to the furnace although separate feeds for each constituent may be used.

To initiate the reaction, a quantity of the ore-carbon mixture is introduced into the furnace in amount sufficient to establish a bed about 1 to 6 feet in height. Chlorine is introduced into the reservoir 42, with or without air or oxygen, and flows through conduits 30 at a rate sufficient to establish a fluidized or dynamic bed.

As explained above, the velocity of the gases to maintain the bed in the required fluid state will vary with the size of the particles. For example, with a mean weight particle size of 130 microns, the velocity necessary to fluidize the particles at 800° C. may range from 2 to 100 centimeters per second. However, for maximum utilization of chlorine as described above, the velocity of the gases preferably should be about 6 to 40 centimeters per second.

The chlorine thus introduced chlorinates metal components of the bed, forming and vaporizing titanium tetrachloride and iron chloride. These chlorides are carried away from the bed and are conducted to a condensation system through duct 18. As a consequence of the chlorination, heat is evolved, thus maintaining the temperature of the bed at reaction temperature.

The reaction can be carried out continuously by feeding further chlorine, ore, and carbon continuously or intermittently to the bed and withdrawing the vapors from the bed. The temperature of the bed may be maintained at a convenient level by controlling the rate of chlorination. When the temperature is low, the rate of chlorine introduced is increased and vice versa. Ore is introduced at a rate sufficient to maintain a bed at least one foot deep, measured when the bed is static, i.e., with chlorine flow off.

The carbon is introduced at a rate sufficient to maintain a substantial concentration of carbon in the reaction bed. For chlorination of rutile, the preferred concentration is approximately 20 percent by weight, based upon the weight of the ore. With other ores, the optimum concentration may be determined by laboratory experiments, as is understood in the art.

From time to time, samples of the reaction bed may be withdrawn through outlet 28 and analyzed in order to follow the process. In like manner, samples of the gases resulting from the reaction may be withdrawn through outlets 24 and/or 26 and analyzed for chlorine, titanium tetrachloride, and other metallic components.

To ensure accurate and uniform feed of chlorine through the orifices, it is preferable to make use of machined orifices which produce a predetermined pressure drop (or loss in static head) as a consequence of flow therethrough. This is important, as has already been explained, in order to promote uniformity of distribution of chlorine flow over the entire cross-sectional area of the reaction zone. Thus, it becomes important to avoid substantial change in the orifices as the process proceeds from day to day or week to week.

According to this invention, such change may be minimized by maintaining the temperature of the orifices below the temperature at which substantial attack of the metal of the orifice by the chlorinating gas can take place. Thus, if the orifice is of iron, the temperature thereof should be maintained below about 250° C., preferably below 200° C. If the orifice is of nickel, the temperature thereof may be somewhat higher, preferably below 600° C. This may be accomplished if the thickness of base plate 40 is sufficiently great and its heat insulating properties sufficiently high. In such a case, the chlorinating gas supplied to header 42 is supplied at a temperature well below 150° C., usually in the range of 25 to 100° C. or below, and the temperature of the orifices thus remains below 150° C.

The pressure of the chlorinating gas in reservoir 42 normally is superatmospheric. The magnitude of this pressure must be sufficiently high at least to equal the sum of pressure drop across the orifices, the pressure drop across the bed, and the pressure drop due to frictional losses in the conduits. Frequently, the pressure in this header will be as low as 6 to 8 pounds per square inch gauge when the reaction is initiated and may rise to 20 to 25 pounds per square inch gauge or higher in later stages of the reaction.

The overall differential pressure between the interior of the header 42 and the top of the dynamic bed undergoing chlorination also depends upon the depth of the bed. To achieve best efficiency, the depth of the bed is kept low enough so that the pressure drop across the bed itself is not more than about twice the drop across the orifice. Where the drop across the orifice is about 2 to 5 pounds per square inch, the depth of the fluidized bed usually has been kept at about 1 to 6 feet.

After the chlorination proceeds for a long time, plugging of the ports in the heads may proceed to such a degree as to make further operation difficult. In such case the entire distributor 12 may be removed and replaced with a new one. Thereafter, further ore and carbon may be introduced into the furnace and the chlorination process restarted.

Figure 4:
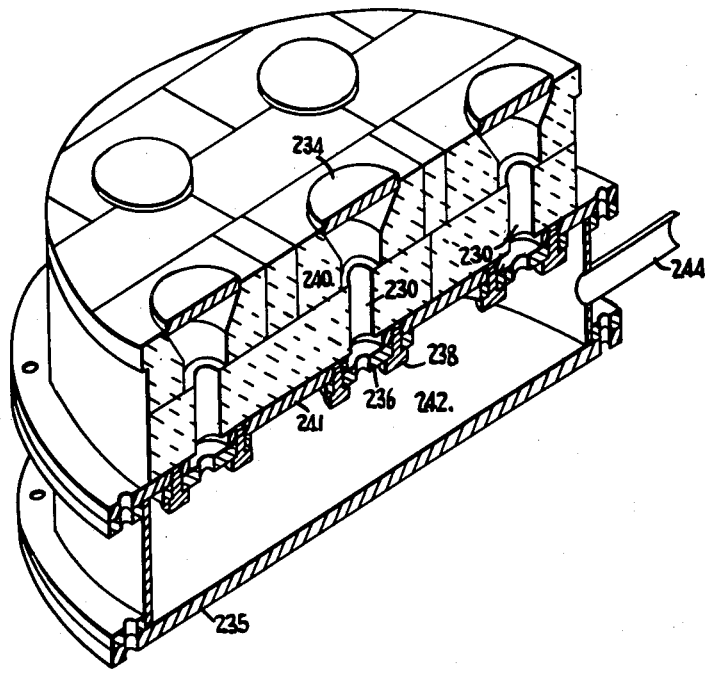
FIG. 4 is a perspective view of an alternative embodiment.

FIG. 4 illustrates a further embodiment of a chlorine distributor which may be used in lieu of the one described above. This distributor comprises a plate 241 fastened to a shell 235, thus providing a gas tight reservoir 242. Refractory base 240 is mounted on plate 241 and is provided with conduits 230 extending therethrough which are closed in their upper ends by porous discs 234 which permit free passage of chlorine therethrough. The lower ends of these conduits 230 are closed by orifice plates 236 fastened to plate 241 by studs 238. Reservoir 242 has a supply inlet 244 for supply of chlorinating gas thereto.

Numerous distributing means may be provided in lieu of those discussed, as will be understood in the art.

The following examples are illustrative:

EXAMPLE I

The chlorination of the titanium bearing material was conducted in a shaft furnace consisting of an outer steel shell lined with chlorine-resisting brickwork and having an internal diameter of 2 feet 6 inches. Near the base of the shaft furnace was a perforated plate, the perforations of which were fitted with orifices of restricted diameter and superimposed by ceramic gas-permeable barriers. The pressure drop across each of these orifices was 6 pounds per square inch. This plate comprises a refractory body, for example, jointed brickwork superimposed onto a steel base plate, the brickwork or a suitable cast refractory and base plate being formed with registering apertures each of which had an upper conical section at the top of which was inserted a disc of porous ceramic material, e.g., silica sand, cemented or lightly sintered. Beneath the base plate, apertured discs were attached to it and defined entrance orifices to the passages leading to the porous ceramic discs. These discs permitted the up-rising gases to enter the furnace but prevented dust or other solid material from passing down through the plate. Below the plate was a port through which chlorine gas was admitted. At the top of the shaft was provided a star valve through which a mixture of the titanium bearing material and carbon was admitted. Also on one side of the furnace near the top was provided a port from which the gases leaving the fluid bed were conveyed to the condensing system.

To commence the process, the chlorinator was filled with mineral rutile to a depth of 3½ feet and then fluidized by the admission of air and direct gas firing applied internally to raise the temperature to 900° C. Carbon was then added to produce a bed containing 20 percent of carbon by weight.

Thereafter, chlorine was fed into the hot mass at a uniform rate of 400 pounds per hour to maintain a fluidized bed with a fluid gas velocity of about 18 centimeters per second at the operating temperature. The bed was maintained by feeding continuously through the star valve a mixture of mineral rutile and coke having the following analysis:

*Table I*

|  | Rutile, percent | Coke, percent |
| --- | --- | --- |
| $TiO_2$ | 97.40 |  |
| C |  | 96.50 |
| $SiO_2$ | 0.40 | 1.40 |
| $Fe_2O_3$ | 1.10 | 0.90 |
| $ZrO_2$ | 0.60 |  |
| $Al_2O_3$ |  | 1.00 |
| $V_2O_5$ | 0.50 |  |
|  | 100.00 | 99.80 |
| Particle sizes | 130 M | 20–100 mesh |
|  | (British Standard Mesh Size) | | the mixture being periodically controlled to maintain the carbon-ore mixture at 20 percent by weight of carbon in the bed. The temperature throughout was maintained at between 850 and 950° C. The gases leaving the furnace were cooled externally and titanium tetrachloride recovered therefrom.

The following table indicates the distribution of certain components other than $TiO_2$ and carbon in the mineral-carbon mixture within the fluid bed:

*Table II*

| Running Time, Days | Weight of components in bed in Kilograms | | |
| --- | --- | --- | --- |
|  | $ZrO_2$ | $SiO_2$ | Other |
| 0 | 4 | 5 | 13 |
| 4.7 | 73 | 42 | 79 |
| 6.7 | 116 | 41 | 35 |
| 10.0 | 171 | 102 | 22 |
| 15.7 | 155 | 94 | 41 |

During the first few days of operation there was an increase in the amount of certain components, mainly oxides of zirconium and silicon, in the bed. After further continuous operation, a state was reached in which the amount of such components present rose and fell mainly due to lower or higher temperatures of operation within the range given above, but there was no build up of impurity level above this approximately steady state. When these conditions were attained, it can be regarded that the ore feed was being completely chlorinated and the operation continued to the end of the 16 days' run without any necessity to purge the bed.

EXAMPLE II

The furnace used in this experiment had an internal diameter of 18 inches. The chlorine was introduced at the bottom to the distribution device of the type illustrated in FIGS. 1 and 2 in which there were provided 21 gas ports each provided with orifices 1/16-inch in diameter. The pressure drop across the gas distributor was approximately 6 pounds per square inch. The ore used was natural rutile having approximately the composition set forth in Example I.

Chlorination was initiated according to the method described in Example I, the amount of ore and carbon being introduced at a rate sufficient to establish a carbon concentration of approximately 20 percent by weight, based upon the weight of the ore bed, and to introduce into the reactor enough ore such that the average height of the bed, when measured in static condition, normally was maintained at about 3.5 feet throughout the period of reaction. This operation was continued over a period of many days. The typical operation conditions were as follows:

Chlorine rate of introduction _____ 180 pounds per hour.
Introduction of oxygen_____ 25 liters per minute.
Pressure drop across the gas distributor _____ 6 pounds per square inch.
Pressure drop across the bed__ 3 pounds per square inch.
Average composition of the bed _____ 50% rutile, 30% zircon, 20% carbon.
Temperature of the bed_____ 900° C.

During the period of operation, approximately 2.35 tons of titanium tetrachloride was produced per day. The chlorine utilization exceeded 99 percent.

Addition of ore was controlled so as to maintain the bed height in the range of 1.7 to 6.6 feet in depth, the depth being measured with the gas off, that is, as a static bed. Once a shift, introduction of chlorine was discontinued for a few minutes in order to measure the static bed and to estimate the composition of the bed in terms of rutile and coke.

The ore which was fed had the following average particle size:

|  | Percent by weight |
| --- | --- |
| 44 to 76 microns | 0.2 |
| 76 to 104 microns | 3.9 |
| 104 to 124 microns | 54.5 |
| 124 to 152 microns | 30.2 |
| 152 to 188 microns | 11.0 |
| Greater than 188 microns | 0.2 |

EXAMPLE III

A shaft furnace 18 inches in internal diameter and 11 feet high was fitted with a perforated base having a gas chamber below and ports fitting into the gas chamber for admitting chlorine or air separately. The top of the furnace was sealed with an inlet port for feeding the mineral and coke constituents, with provision for the temporary insertion of a gas burner described below for heating up the apparatus. A further port was provided for the admission of coolant titanium tetrachloride. The furnace was further fitted with an exit port at the side near the sealing cap for discharge of the gases from the chlorination zone to the initial cooling apparatus where the gases were cooled by the admission of ferric chloride to a temperature of 300° C. The perforations in the perforated plate, totaling 20, were each fitted with a detachable orifice on the under side of the plate and with a gas permeable disc on the upper side. The orifices each had a diameter of 1.2 millimeters and the perforated discs were constructed of sintered ceramic material, each having a permeability to air at room temperature and pressure of eight liters per minute for a pressure drop of one inch of water.

The gases produced by the chlorination were led to a first cooling tower where ferric chloride was admitted as cooling agent. The gases leaving the latter tower were conveyed to a second tower where they were cooled by an atomized spray of titanium tetrachloride to 130° C. which precipitated the ferric chloride constituent of the gases into a comparatively coarse condition suitable for removal by settling at the base of the tower. The cooled gases were then led to a conventional indirect condenser where they were reduced to a temperature below 0° C. in order to remove in liquid form the titanium tetrachloride constituent. In the operation of this apparatus, the procedure was as follows:

Above the perforated plate of the chlorinator was introduced a bed 3 feet high consisting of 80 percent by weight of mineral rutile having a particle size 80 to 200 microns and 20 percent by weight of coke having a particle size 50 to 500 microns. This bed was fluidized by the passage of air through the perforated plate described above at the rate of 200 pounds per hour and was heated by means of a suitably constructed gas burner inserted through the top of the furnace, the flame playing onto the top of the fluidized mass. In this way the temperature was raised to 950° C. The gas jet was then removed and the air supply cut off. Chlorine was immediately admitted into the chamber below the perforated plate in order to fluidize the bed at the rate of 180 pounds per hour. At the same time, ilmenite ore of size 100 to 250 microns and coke of size as above were fed to the bed in such quantities that the height of the bed was maintained at 3 feet and the coke content of the bed was maintained at 20 percent by weight. These quantities averaged about 110 pounds ilmenite and 20 pounds coke per hour. The ore used was Quilon ilmenite containing 59.6 percent $TiO_2$, 24.9 percent Fe, and a total of 1.2 percent by weight of alkali and alkaline earth oxides. Through the other port in the sealing cap at the top of the furnace, liquid titanium tetrachloride was added to the bed at the rate of 30 pounds per hour to control the temperature not to exceed 970° C. The gases left the chlorination furnace at a temperature of 900° C. and contained less than one percent of free chlorine. They were led to the first cooling tower to be cooled therein by addition of finely divided ferric chloride added at the rate of 300 pounds per hour. This addition, together with the heat losses taking place in the apparatus, sufficed to produce a gas from the cooler having a temperature of 300° C. The gases were subsequently cooled to a temperature of 130° C. in the second tower by the injection of an atomized spray of titanium tetrachloride and the ferric chloride produced settled in a succeeding dust separator. The gases were subsequently passed through a series of tube condensers where they were cooled to below —10° C. to condense the titanium tetrachloride constituent.

The process as above described was carried on for 12 hours. During substantially the entire period of the run, the iron oxide content of the bed remained below 10 percent by weight.

Various other metal bearing materials such as the oxides, carbides or carbonitrides of zirconium, chromium, iron, thorium, uranium or like metals may be chlorinated using the above described apparatus.

Means other than the porous diaphragms 234 may be used to obstruct passage of solid particles of ore or the like into the channels or conduits 30 or 230. Thus a static porous bed of refractory granules or coke granules may be laid on plate or base 40 or 240 for this purpose.

Although the various embodiments of the invention have been described with reference to specific details of certain features thereof, it is not intended that such details shall be regarded as limitations upon the scope of the invention except insofar as included in the accompanying claims.

This application is a continuation-in-part of applications Serial No. 469,062, filed November 15, 1954, and Serial No. 509,964, filed May 20, 1955, now United States Patent No. 2,855,273.

What is claimed:

1. Apparatus for chlorinating a metal bearing material which comprises a furnace having a chlorination zone, a heat insulating refractory base extending across the lower portion of the zone, a metal plate supporting the base, a chlorine chamber below the metal plate, perforations in the base aligned with perforations in the metal plate constituting conduits extending from the chlorination zone to the chlorine chamber, removable restricted entrance orifices to the conduits which are separated from the chlorination zone by the refractory base and which give rise to a pressure drop between the chlorine chamber and the chlorination zone and means associated with the conduits which obstruct movement of solids from the chlorination zone into the conduits while permitting free passage of chlorine therethrough.

2. The apparatus of claim 1 wherein said means attached to the conduits to obstruct downward movement of solids through the conduits comprise chlorine permeable discs in said conduits.

3. The apparatus of claim 1 wherein the restricted entrans orifices are fastened to the metal plate and are sealed thereto to prevent passage of chlorine between the metal plate and said orifices.

4. The apparatus of claim 1 wherein the restricted entrance orifices provide a substantial pressure drop between the chlorine chamber and the chlorination zone.

5. The apparatus of claim 1 wherein the refractory slab is of a size sufficient to hold the temperature of the orifices below chlorination temperature.

References Cited in the file of this patent

UNITED STATES PATENTS

| | | |
|---|---|---|
| 2,503,788 | White | Apr. 11, 1950 |
| 2,813,016 | Thornhill | Nov. 12, 1957 |
| 2,841,476 | Dalton | July 1, 1958 |
| 2,856,264 | Dunn | Oct. 14, 1958 |

FOREIGN PATENTS

| | | |
|---|---|---|
| 521,712 | Belgium | Aug. 14, 1953 |